(12) United States Patent
Peyton

(10) Patent No.: US 7,971,186 B1
(45) Date of Patent: *Jun. 28, 2011

(54) AUTOMATIC EXECUTION FLOW ORDERING

(75) Inventor: Eric S. Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 1276 days.

This patent is subject to a terminal disclaimer.

(21) Appl. No.: 10/876,940

(22) Filed: Jun. 25, 2004

(51) Int. Cl.
*G06F 9/44* (2006.01)

(52) U.S. Cl. .................. 717/115; 717/109; 717/113

(58) Field of Classification Search .................. 717/109, 717/113, 115
See application file for complete search history.

(56) References Cited

U.S. PATENT DOCUMENTS

| | | | | |
|---|---|---|---|---|
| 5,729,730 | A | 3/1998 | Wlaschin et al. | 395/603 |
| 5,855,014 | A | 12/1998 | Smith | 707/3 |
| 5,999,911 | A | 12/1999 | Berg et al. | 705/9 |
| 6,041,325 | A * | 3/2000 | Shah et al. | 707/10 |
| 6,173,437 | B1 * | 1/2001 | Polcyn | 717/100 |
| 6,380,951 | B1 * | 4/2002 | Petchenkine et al. | 715/736 |
| 6,449,627 | B1 | 9/2002 | Baer et al. | 707/514 |
| 6,467,081 | B2 * | 10/2002 | Vaidyanathan et al. | 717/123 |
| 6,493,731 | B1 | 12/2002 | Jones et al. | 715/501.1 |
| 6,505,219 | B1 | 1/2003 | MacLean et al. | 707/530 |
| 6,925,593 | B1 * | 8/2005 | Knutson et al. | 715/222 |
| 7,100,147 | B2 | 8/2006 | Miller et al. | 717/102 |
| 7,120,896 | B2 | 10/2006 | Budhiraja et al. | 717/105 |
| 7,284,234 | B2 * | 10/2007 | Steg et al. | 717/113 |
| 7,346,844 | B1 | 3/2008 | Baer et al. | 715/514 |
| 7,428,535 | B1 | 9/2008 | Peyton et al. | 707/5 |
| 2002/0120786 | A1 | 8/2002 | Sehayek et al. | 709/310 |
| 2002/0138358 | A1 | 9/2002 | Scheer | 705/26 |
| 2002/0161674 | A1 | 10/2002 | Scheer | 705/28 |
| 2002/0178211 | A1 | 11/2002 | Singhal et al. | 709/201 |
| 2003/0041314 | A1 * | 2/2003 | Heeren et al. | 717/109 |
| 2003/0083910 | A1 | 5/2003 | Sayal et al. | 705/7 |
| 2005/0256818 | A1 * | 11/2005 | Sun et al. | 706/46 |
| 2006/0236304 | A1 | 10/2006 | Luo et al. | 717/105 |

OTHER PUBLICATIONS

Silberschatz and Galvin, "Operating System Concepts", Dec. 1997, Addison-Wesley, 5th Edition, ISBN 0-201-59113-8, Chapters 4 and 5.*
U.S. Appl. No. 10/877,292, filed Jun. 25, 2004, Peyton et al.
U.S. Appl. No. 10/876,931, filed Jun. 25, 2004, Peyton et al.

* cited by examiner

*Primary Examiner* — James D Rutten
(74) *Attorney, Agent, or Firm* — Williams, Morgan & Amerson, P.C.

(57) ABSTRACT

A computer-implemented method and apparatus for programming a computing apparatus are disclosed. The method is a computer-implemented method for use in a computer programming environment, and comprises invoking a script; and determining an execution order for the invoked script predicated on the passing of parameters between scripted actions. The apparatus, in a first aspect, includes a program storage medium encoded with instructions that, when executed by a processor, performs the method. In a second aspect, the apparatus includes a computing apparatus programmed to perform the method.

26 Claims, 7 Drawing Sheets

AUTOMATIC EXECUTION FLOW ORDERING

BACKGROUND OF THE INVENTION

The present application is related to the following United States Patent Applications:

United States patent application entitled, "Visual Programming Tool" Ser. No. 10/877,292, filed in the names of Eric Peyton, et al. on an even date herewith; and commonly assigned herewith;

United States patent application entitled, "Automatic Relevance Filtering" Ser. No. 10/877,306, filed in the names of Tim Bumgarner, et al. on an even date herewith; and commonly assigned herewith; and United States patent application entitled, "Automatic Conversion for Disparate Data Types" Ser. No. 10/876,931, filed in the names of Eric Peyton and Tim Bumgarner on an even date herewith; and commonly assigned herewith.

Each of these applications is hereby incorporated by reference in full as if set forth herein verbatim.

1. FIELD OF THE INVENTION

The present invention pertains to computer programming, and, more particularly, to a visual programming tool for a computing apparatus.

2. DESCRIPTION OF THE RELATED ART

Despite dramatic increases in recent years, some impediments to the use of computing technology by society at large still persist. Historically, the greatest impediment, aside from the computing capabilities themselves, was the user interface with the computer, or platform. At one time, the user interface consisted of a prompt at which a user entered a command. Typically, the command had to be selected from a list of commands whose content depended on the operating system under which the platform ran. Most operating systems provided some flexibility to the user by permitting the use of parameters, sometimes called "switches," in conjunction with the command. The user could then "program" the computer through the user interface to tailor the operation of the platform to their particular needs by entering the command and the appropriate parameters. The user could also open a text editor to create a text file that could be saved and used as a program.

This type of interface has some inherent drawbacks for programming. One significant drawback is that the commands and parameters must be memorized and/or looked up in a manual. This drawback is compounded by at least several factors. First, the commands and their parameters frequently were not intuitive, making them difficult to memorize. Second, the syntax for each command was typically very different. Third, the list of commands and parameters and the syntax frequently varied drastically depending on the type of operating system on which the platform was operating. These kinds of factors meant that the skills needed for interfacing with the computer were relatively specialized, and required some degree of time and effort to acquire. Consequently, the ability to work with computers remained limited to relatively small groups of people.

Much of this changed dramatically with the introduction of the "graphical user interface," or "GUI." The GUI takes the programming burden off the user by encapsulating the commands and their parameters in applications represented by graphical elements known as "icons" displayed to the user. The user then typically uses a pointing device, such as a mouse, a joystick, or a touchpad, to place a cursor over the icon. The choice is entered in manner depending on the type of pointing device employed. With a mouse, for instance, the user clicks a button, usually twice, to enter the selection. Thus, the user no longer needs to memorize lists of arcane commands and parameters, much less their syntax. Plus, the "drag and click" technique easily transfers to other platforms employing different GUIs. The user need only learn the functionality associated with the applications being selected.

The introduction of the GUI, coupled with dramatic increases in computing capabilities, opened the computing world to very many more users on a personal level. However, in taking the programming burden off the user, the encapsulation described above also inhibits the user's ability to program when they wish to do so. The GUI just does not include access to the programming levels of the operating system. The user can exit the GUI to enter a text-based interface such as the one first described. At that point, programming can occur. Or, the user can open a text editor with the GUI and enter text that will constitute a program. However, the user must still have previously acquired a working knowledge of the programming language, including commands, parameters, and syntax. But the GUI itself offers no way to visually program the platform without knowledge of a programming language's commands, parameters, and syntax.

Some attempts have been made to remedy this situation. For instance, an application known as "Khoros Cantata" uses graphical elements known as "glyphs" on a grid to replace lines of code to perform a kind of "visual programming." However, this technique only alleviates the need to manually enter the text of the program. The user is still required to program, and manual entry of values is still generally required. There is also a type of scripting where a user interface ("UI") is generated based on some criteria and then presented to the user at either design or runtime (e.g., Commando, Linux GUI builders, etc.). While the scripting may alleviate some repetition, it still nevertheless requires that the user, at least in the first instance, actually perform the programming.

Programs and utilities that support automated scripting exist to permit users to create scripts of user-level commands that may span disparate programs or contexts. These programs and utilities are often simple programs without extensible features or modular "programming" and/or without the ability to resolve incongruities in the "program" being scripted."

The present invention is directed to resolving, or at least reducing, one or all of the problems mentioned above.

SUMMARY OF THE INVENTION

The present invention, in its various aspects and embodiments, includes a computer-implemented method and an apparatus for programming a computing apparatus. The method is a computer-implemented method for use in a computer programming environment, and comprises invoking a script; and determining an execution order for the invoked script predicated on the passing of parameters between scripted actions. The apparatus, in a first aspect, comprises a program storage medium encoded with instructions that, when executed by a computing device, performs the method. In a second aspect, the apparatus comprises a computing apparatus programmed to perform the method. The method and apparatus are extensible and modular, to support flexible script creation, as needed by a user, and also involve features to resolve implicit incongruities in the work flow created by a user. Additional aspects of the invention include a framework and graphical user interface for creating user level work flows.

BRIEF DESCRIPTION OF THE DRAWINGS

The invention may be understood by reference to the following description in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
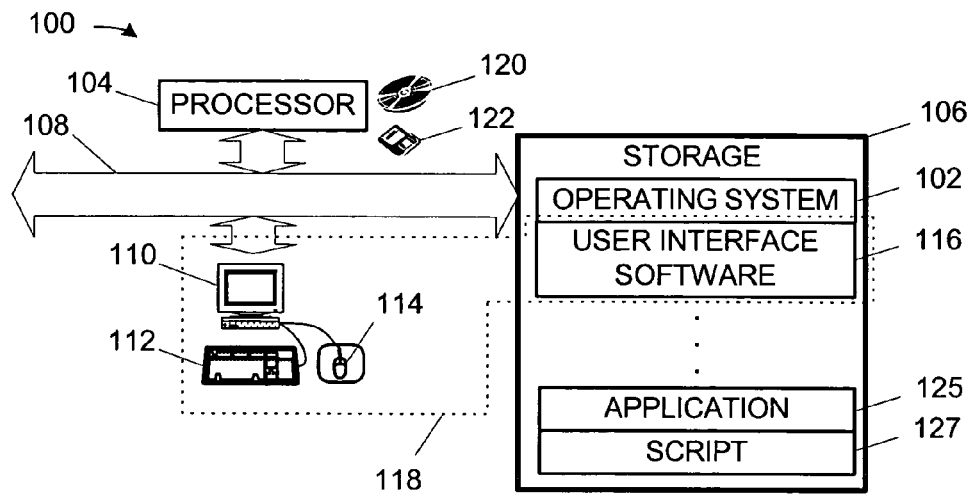
FIG. 1 conceptually depicts, in a partial block diagram, selected portions of the hardware and software architectures, respectively, of a computing apparatus such as may be used to implement the present invention.

FIG. 1 depicts selected portions of the hardware and software architectures of a computing apparatus 100 programmed and operated in accordance with the present invention. Some aspects of the hardware and software architecture (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing apparatus 100 will include many such routine features that are omitted from FIG. 1.

Note that the present invention is largely computer-implemented with user interaction. Some portions of the detailed descriptions herein are consequently presented in terms of a software implemented process involving symbolic representations of operations on data bits within a memory in a computing apparatus. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied is to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Returning now to FIG. 1, in the illustrated embodiment, the computing apparatus 100 is a Power Mac® personal computer available from Apple Computer, Inc., employing a MacOS operating system 102. However, the invention is not so limited. The computing apparatus 100 may be implemented in virtually any type of electronic computing apparatus such as a general purpose computer, PDA, cell phone, or any other device for which user-level programming, or scripting, is desirable. The computing apparatus 100 may also employ other, alternative, operating systems (e.g., Windows™-based or disk operating system ("DOS")-based, Linux, PalmOS, Symbian, etc). The computing apparatus 100 may be, for instance, a workstation, employing a UNIX-based operating system. The invention is platform independent in the sense that it can be any type of platform employing any type of operating system.

The computing apparatus 100 also includes a computing device, i.e., the processor 104, communicating with storage 106 over a bus system 108. The computing apparatus 100 includes a monitor 110, keyboard 112, and a mouse 114, which together, along with their associated user interface software 116 residing on the storage 106 comprise a user interface 118. The user interface 118 in the illustrated embodiment is a graphical user interface ("GUI"), but this is not necessary to the practice of the invention. Practically any type of user interface known to the art may be employed to implement the invention.

The processor 104 may be any suitable processor known to the art. For instance, the processor may be a general purpose microprocessor or a digital signal processor ("DSP"). In the illustrated embodiment, the processor 104 is a Power PC microprocessor manufactured by International Business Machines Corp. ("IBM"), but the invention is not so limited. In alternative embodiments, the processor 104 may be an Athlon™ 64-bit processor commercially available from Advanced Micro Devices, Inc. ("AMD"), a 64-bit UltraS-PARC™ or the 32-bit microSPARC™ from Sun Microsystems, any of the Itanium™, or Pentium™, or Alpha™-class processors from Intel Corporation. The processor 104 may also be implemented as a processor set, including a general purpose microprocessor and a math or graphics co-processor, for instance. However, the invention is not limited to a computing apparatus employing a processor. In alternative embodiments, the computing device may be, for instance, a controller.

The storage 106 typically includes a variety of memory types such as read only memory ("ROM"), a cache, a hard disk, and random access memory ("RAM"), none of which are individually shown. The storage 106 may also, in some embodiments, include removable storage such as an optical disk 120, or a floppy electromagnetic disk 122, or some other form, such as a magnetic tape (not shown) or a zip disk (not shown). Note that the memory types will be implemented using various technologies. For instance, the optical disk 120 is an optical medium, while the floppy electromagnetic disk 122 is magnetic. Still other technologies may be used to implement the various technology types, although most will be either magnetic or optical.

The bus system 108 similarly may employ any bus technology and operate in accordance with any suitable bus protocol known to the art. The illustrated embodiment, for instance, operates under the Peripheral Component Interconnect ("PCI") or NuBus protocols. However, numerous other bus protocols are well known and may be employed. Those in the art having the benefit of this disclosure will appreciate that the bus system 108 will typically comprise several electrically interconnected buses (not individually shown). For instance, a command bus, a data bus, and an expansion bus are frequently seen in suitable bus systems. The present invention nevertheless admits wide variation in implementing the bus system 108, as well as the processor 104 and storage 106. Thus, the invention is not limited by these aspects of any particular implementation of the computing apparatus 100.

Figure 2:
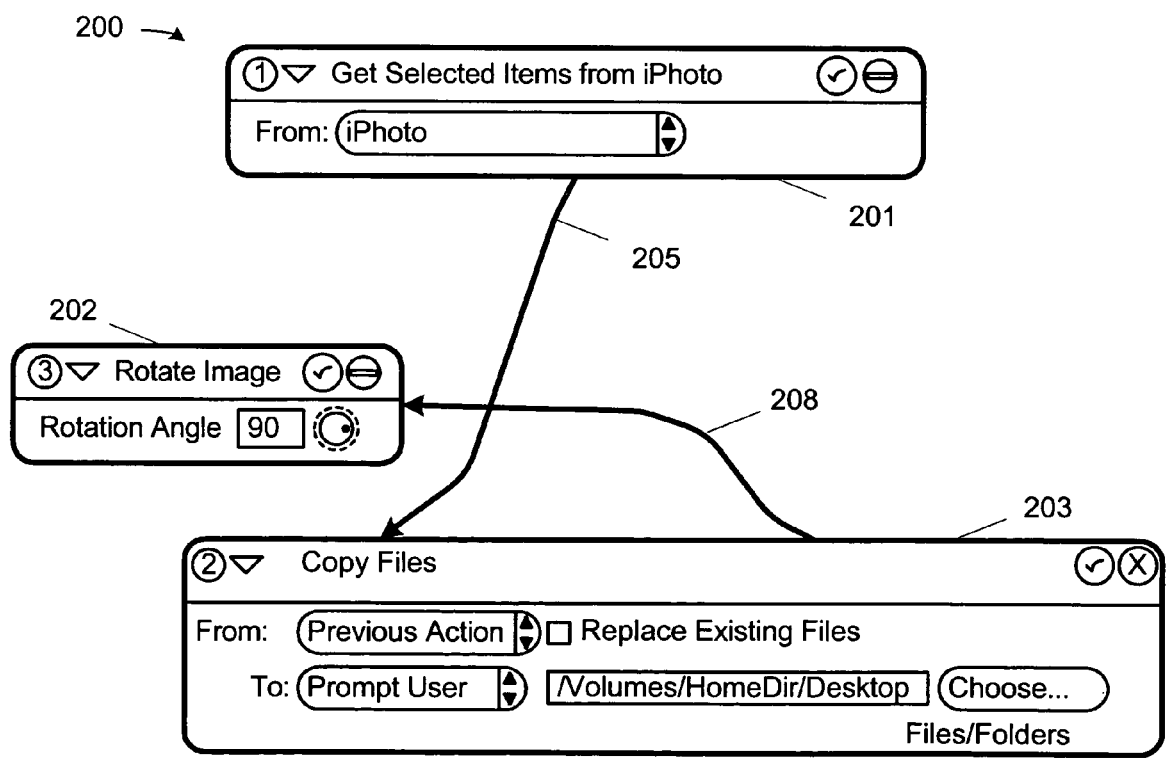
FIG. 2 depicts several selected actions for use in illustrating a workflow ordering feature of some alternative embodiments of the present invention.

An application 125 also resides in the storage 106. The application 125, when invoked by a user through the user interface 118, performs a method in accordance with the present invention with the interaction of the user. More particularly, the application 125 performs a method for automatically determining an execution order in a scripted workflow. One particular embodiment is illustrated in FIG. 2-FIG. 3B. As was noted above, the present invention is platform independent in the sense that it can be practiced on practically any computing platform. However, for the sake of clarity, the embodiment of FIG. 2-FIG. 3B shall be disclosed in the context of the computing apparatus 100 of FIG. 1.

The present invention automatically determines an execution or program flow for a scripted workflow. The script 127 does not necessarily have to perform the scripted actions in the order specified in creating the workflow. In some embodiments, the execution order in which the actions of a scripted workflow are to be performed, i.e., the flow of the program or data, can be defined by the order in which those actions are scripted by the user. However, in present invention, the order of selection during creation is only a starting point from which the application 125 determines the flow automatically.

Consider the scenario 200, shown in FIG. 2, in which the actions 201-203 are conceptually depicted. There are three actions 201-203: an action 201 to retrieve images, an action 202 to rotate images 90°, and an action 203 to copy files from one location to another. Assume the actions 201-203 were selected by the user in the creation of the workflow in the order 201, 203, 202. Note the directed relationship 205 shown between the actions 202, 203 and the directed relationship 208 shown between the actions 201, 203. The directed relationships 205, 208 are defined by the user in the creation of the workflow by the order in which the actions 201-203 are selected. Note that no relationship is specified between the actions 201, 202.

The application 125, in the illustrated embodiment, starts with the first selected action, the action 201, at runtime. In theory, however, the application 125 may choose any selected action 201-203 at random. If the chosen action has no parameter information missing, it is run. If parameter information is missing, then the opportunity to run is passed to the action that is to provide the information. This process iterates until an action is located that requires no input and only provides output or parameters to some other action. Once that action is located, the workflow as created is followed downward, executing each action until an action is reached that takes only input and produces no output. At this point, the workflow is considered finished and that thread of the script 127 is terminated.

For instance, referring now to FIG. 2, suppose the script 127 selects the action 202 as a starting point. If so, the script 127 will be unable to execute the action 202 because it lacks the information to do so—namely, which image(s) to rotate. Thus, the application turns to the preceding selected action, the action 203, following the directed relationship 208 back to the action 203. The action 203, to copy files from location to another, takes files to be copied as input and produces the copied files as output. Since the action 203 needs input, the script 127 follows the directed relationship 205 back up to the action 201. The action 201—to "get" files—requires no input and produces as output the retrieved files. Thus, the script 127 can execute the action 201 and follow the workflow from the action 201, to the action 203, and to the action 202. If the action 202 is the last action in the script 127, the script 127 will terminate. If the action 202 is not the last, then the script 127 will continue. Note that this technique can be adapted for the script 127 to execute multiple threads of the script 127 in parallel.

Figure 3A:
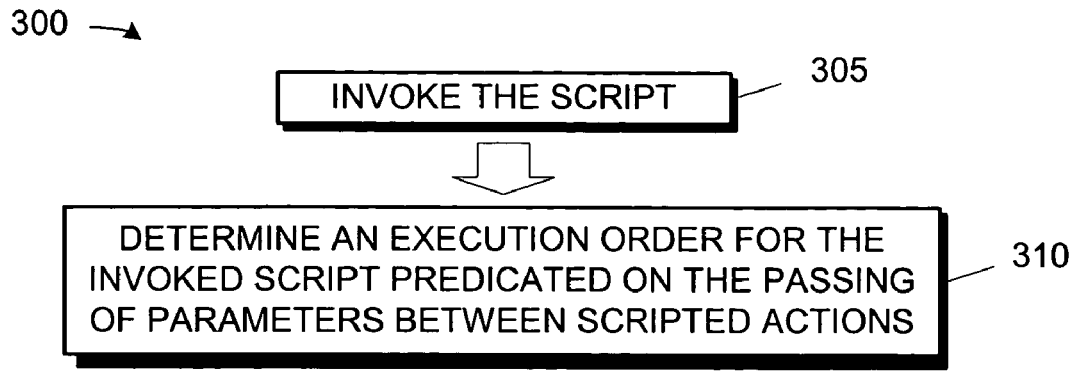
FIG. 3A-FIG. 3B illustrate one particular embodiment of a method in which the workflow through a plurality of selected actions is determined through the specified actions predicated on the passing of parameters between specified actions.
Figure 3B:
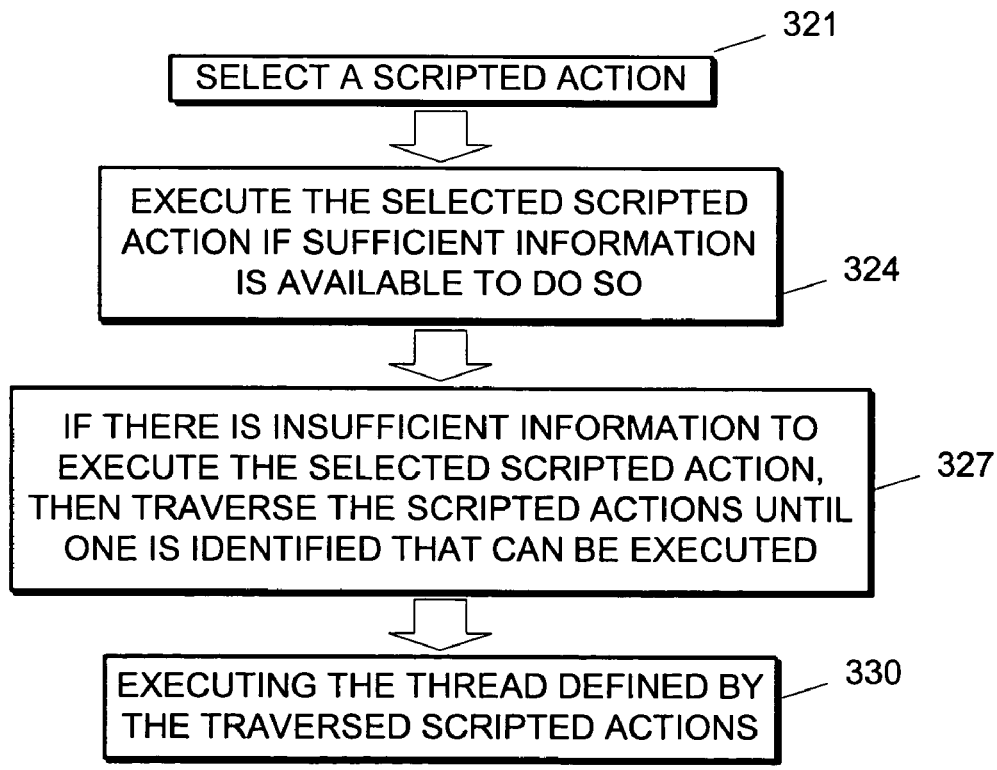

Thus, the invention includes, in one aspect, a computer-implemented method 300, shown in FIG. 3A, for use in a computer programming environment. For present purposes, the term "programming" shall refer to the high level user function of creating a script defining, or scripting, a workflow. The method 300 comprises invoking (at 305) the script 127 and determining (at 310) an execution order for the invoked script 127 predicated on the passing of parameters between scripted actions 201-203. With respect to determining (at 310) the execution order, the illustrated embodiment:

selecting (at 321) a scripted action;
executing (at 324) the selected scripted action if sufficient information is available to do so;
if there is insufficient information (at 327) to execute the selected scripted action, then traversing the scripted actions until one is identified that can be executed;
executing (at 330) the thread defined by the selected, identified, and traversed scripted actions.

Note, however, that the present invention contemplates variation in how the execution order may be determined. Thus, in some alternative embodiments, alternative determination techniques may be employed.

To more fully convey the present invention, one particular implementation of the embodiment in FIG. 1-FIG. 3B will now be disclosed. In this particular embodiment, the present invention is employed in the context of an application 125a through which the user visually programs, as illustrated in FIG. 5, a computing apparatus 400, shown in FIG. 4. The computing apparatus 400 includes, in addition to the content of the computing apparatus 100, a plurality 405 of files $405_0$-$405_x$ residing in the storage 106a. Consider a scenario in which a user frequently culls the files 405 on a periodic, but routine basis. In conventional practice, a user will have to go through several steps to locate and delete the files 405 of interest. If there are numerous files 405, this may not only be tedious in its repetition, but also time-consuming.

Figure 4:
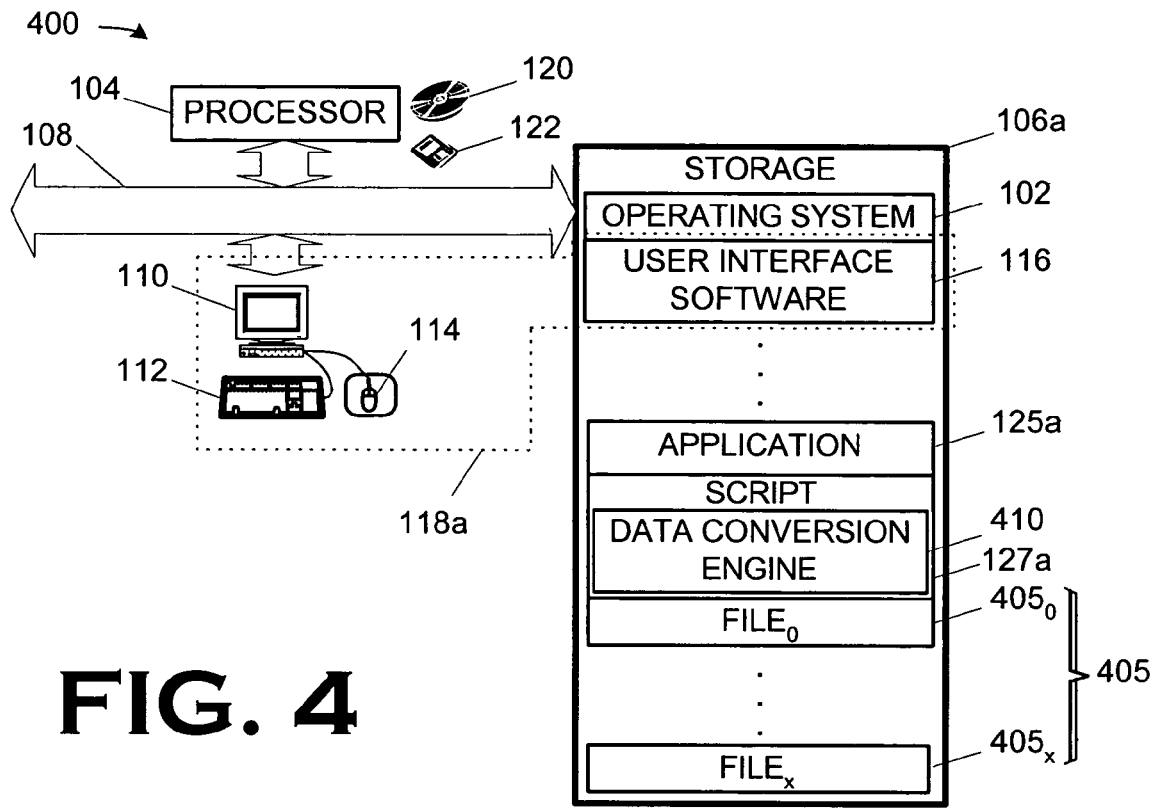
FIG. 4 conceptually illustrates, in a partial block diagram, selected portions of the hardware and software architectures, respectively, of one particular implementation of the computing apparatus of FIG. 1.
Figure 5:
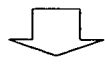
FIG. 5 illustrates one particular embodiment of a method practiced in accordance with one particular embodiment of the present invention.

Referring now to both FIG. 4 and FIG. 5, the method 400 begins with the application 125a receiving (at 405) a plurality of user inputs through the user interface 118. Since the user interface 118a in the illustrated embodiment is a GUI, each user input includes selecting a graphical element (not shown) specifying an action in a workflow. However, other types of user input-techniques may be employed. For instance, an input may be typed by the user in a common gateway interface ("GGI") box in a GUI or in a command entry line in a non-graphical user interface.

Note that a "user input" may actually constitute a set of user interface actions. For instance, a "user input" may include clicking and dragging a graphical element in a GUI using the mouse 114 coupled with a keystroke on the keyboard 112. Thus, in the illustrated embodiment, the user input may be a single click or drag using the mouse 114 or keystroke on the keyboard 112; a set of clicks and/or drags using the mouse 114 or set of keystrokes on the keyboard 112; or some combination of clicks and/or drags using the mouse 114 and keystrokes on the keyboard 112.

In general, the workflow may be considered to be a number of actions intended to produce some desired result. An action may be any programmed functionality of the computing apparatus 100 that takes input and produces output. The number of actions in any given workflow will typically be in the range of 5-7, but the number of actions is not material to the practice of the invention. The user will generally employ commonly known and used GUI techniques, such as "point and click" or "click and drag," with the mouse 114 to select a graphical element. The graphical element will typically be selected from among several choices presented by the application 125a through the user interface 118. The choices may be presented in classic GUI fashion, e.g., in drop down menus, pop-up windows, or sidebar panels.

The application 125a then automatically generates (at 410, in FIG. 4) a background script 127, shown in FIG. 1, for executing the actions in the workflow responsive to the user inputs. In this context, the application 125a automatically generates the script 127a. The script 127a is essentially a batch file containing a plurality of commands or pointers for performing each of the actions in the workflow. Each command includes instruction and information for implementing the specified action. The script 127a may be generated (at 410) by the application 125a as the actions are input by the user or at some other convenient time. One other convenient time would be when the user indicates that the workflow has been fully defined, e.g., by entering a command to save the session with the application 125a or to invoke the script 127a to iterate the workflow.

The script 127a will typically be saved upon direction of the user. The user can then later invoke the script 127a from within the operating system 102 through the user interface 118. Since the user interface 118a in the illustrated embodiment is a GUI, the invocation may be in classic GUI fashion, e.g., through drop down menus, pop-up windows, or sidebar panels. On invocation, the script 127a will execute the commands it contains, which will execute the actions previously specified by the user, as described above, to implement the workflow. Thus, the user will be saved the time-consuming process of performing each of the tasks separately by simply entering the one command invoking the script 127. Note, is however, that is not necessary to store the script 127. The script 127a may be invoked prior to being stored, or subsequent to being stored in various embodiments. Furthermore, although the invention contemplates that the script 127a will typically be invoked multiple times following its generation, such is not required by the invention.

Figure 6:
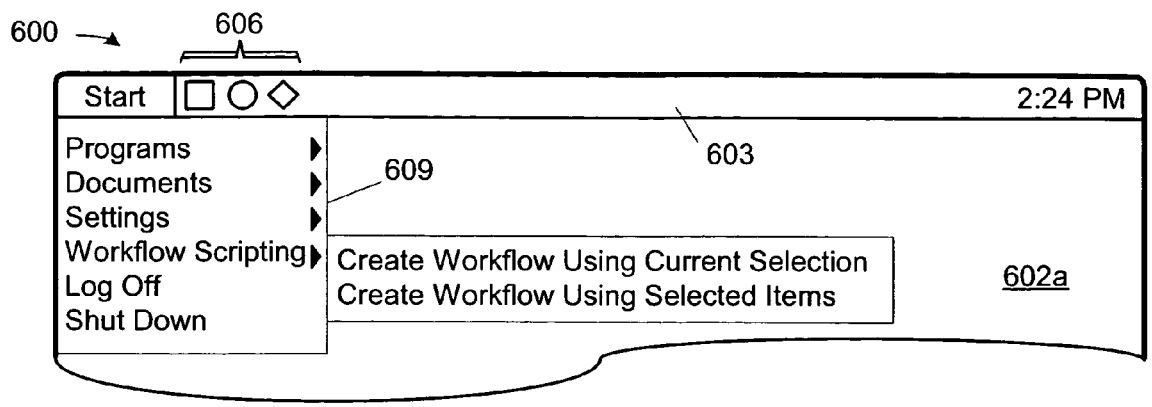
FIG. 6 depicts a portion of an exemplary screen display of the computing apparatus in FIG. 4.

FIG. 6 illustrates a portion of an exemplary screen display 600 on the monitor 110 using the GUI 108a for the computing apparatus 400. The screen display 600 is of an empty desktop 602, and includes a taskbar 603, including several icons 606 through which various applications can be invoked. In the illustrated embodiment, the application 125a implementing the present invention is invoked off a cascading pull-down menu 609 from the taskbar 603. Furthermore, in the illustrated embodiment, the application 125a may be invoked from within a current application by clicking on the "Create Workflow Using Current Selection" selection or from the desktop by clicking on the "Create Workflow Using Selected Items" selection. However, in alternative embodiments, the application 125a may be invoked by clicking on one of the icons 606, provided that one of the icons 606 is a graphical element representing the application 125a.

Figure 7:
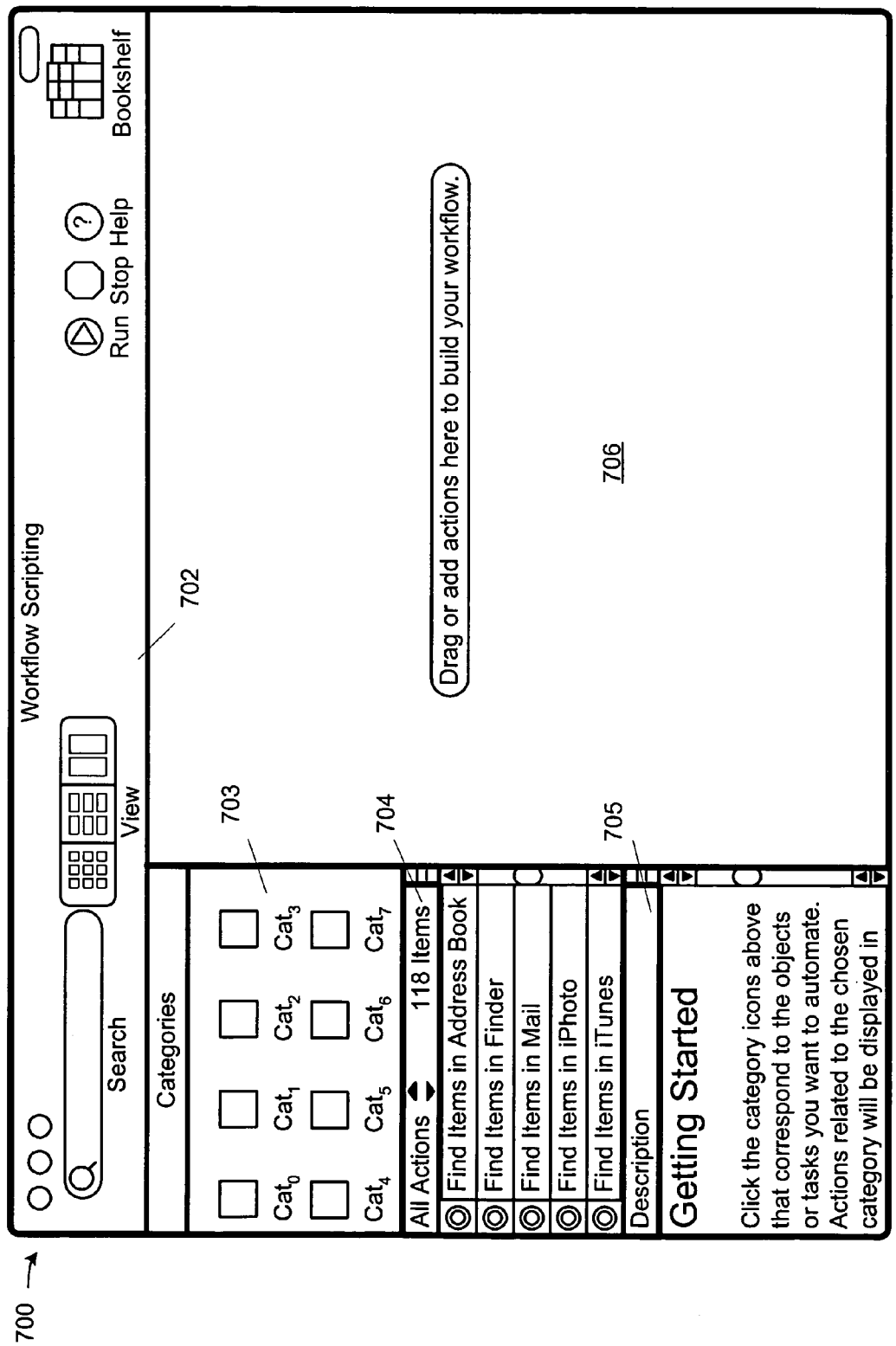
FIG. 7 depicts an empty window for workflow scripting in accordance with the present invention.

On invocation, the application 125a opens a new window 700, shown in FIG. 7. The window 700, in the illustrated embodiment, comprises several panes 702-706. The pane 702 is a header pane presenting a number of more general functions. The panes 703-705 are sidebar panels providing information and options to facilitate creation of the workflow. More particularly, the pane 703 presents several graphical elements $Cat_0$-$Cat_7$ identifying categories of actions from which the user may choose. Categories could be, for instance, groups of actions related to finding files, finding contacts, sending e-mails, opening text editors, etc. The pane 704 presents the user a list of candidate actions that might be selected as a portion of the workflow to be created. Note that each entry in the list of the pane 704 is a graphical element. Note also that, in some embodiments, the list of candidate actions can be defined by the selection of a category from the pane 703. The pane 705 presents explanatory information regarding a selected or candidate action. Finally, the pane 706 provides a workspace for defining the workflow.

Note that the number, structure, presentation, and orientation of the panes 702-706 is implementation specific. For instance, the pane 703 of categories may be omitted, and the user may simply be presented a list of candidate actions such as those in the pane 704. In some embodiments the information may be presented in, for instance, pop-up windows. As an example, upon invocation, the categories represented by the graphical elements $Cat_0$-$Cat_7$ may be presented in a pop-up window. After the user selects a category, the first pop-up window can be replaced by a second pop-up window presenting a list of candidate actions from which to choose. Thus, the structure and presentation of the window 700 will be implementation specific.

The user may begin creating or defining a workflow in the workspace of the pane 706 by selecting actions from the list presented in the pane 704. The selections may be made in conventional GUI fashion. For instance, the user may click and drag an action listed in the pane 704 into the pane 706. Alternatively, the user may double click on the action in the pane 704 and a corresponding graphical element may open in the pane 706. Each of the user selections constitutes a user input that is received by the application 125a (at 405, FIG. 4).

Figure 8:
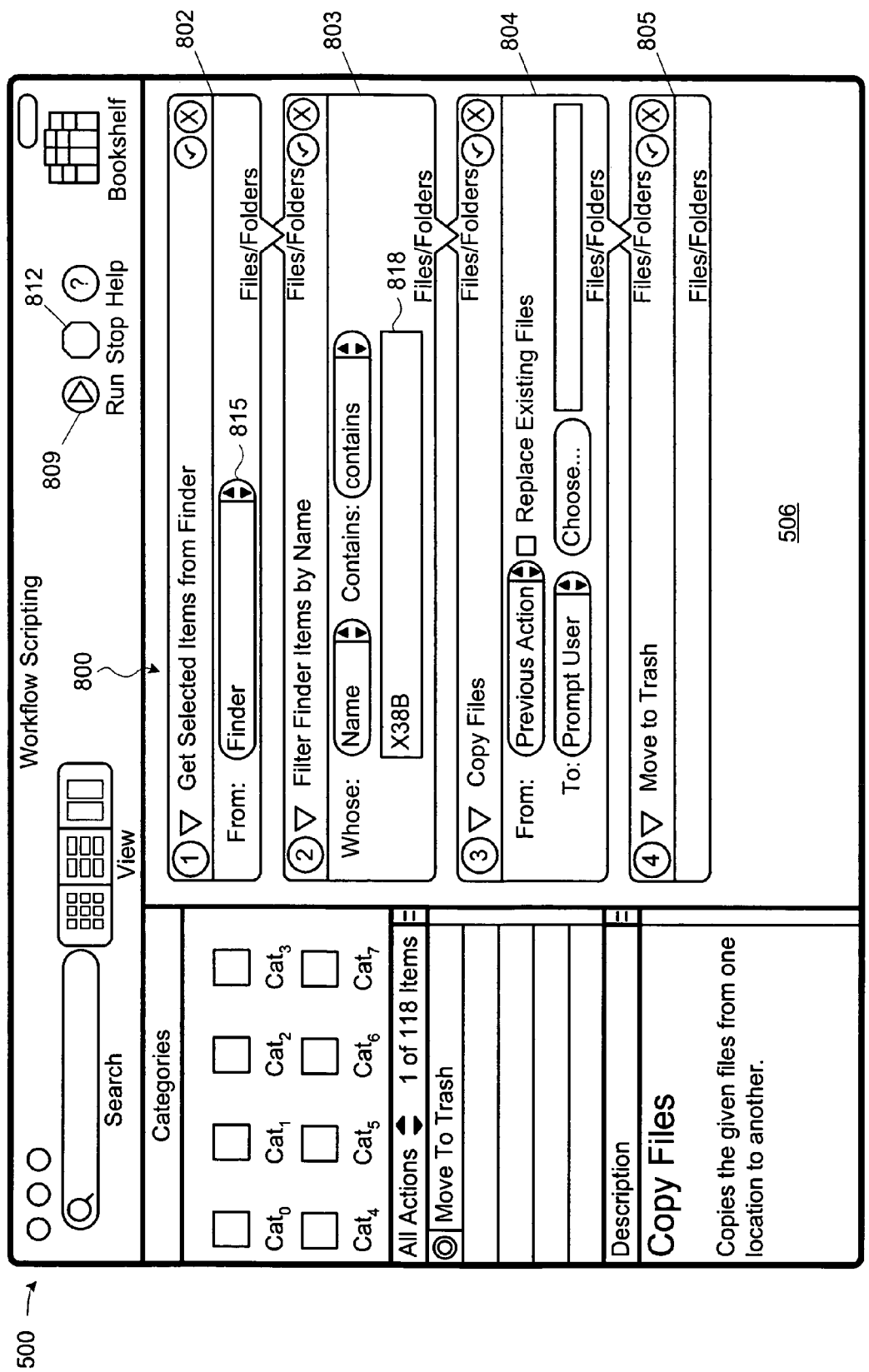
FIG. 8 depicts a defined and scripted workflow in the window of FIG. 7.

FIG. 8 illustrates the window 700 after a workflow 800 has been created in the pane 706. In the workflow 800, the user has defined four actions, namely:

an action 802 that "gets", or retrieves, selected files in the OS using an application called "Finder";
an action 803 that filters out the retrieved files named X38B;
an action 804 that copies the filtered files to a new location; and
an action 805 that trashes the filtered files.

The workflow 800 can then be invoked or saved by clicking on the "Run" or "Stop" buttons 809, 812.

Note that the design of the interface within the pane 706 will be implementation specific. In the actions 802-804, the dialog boxes associated with each action 802-804 include features that permit the user flexibility is defining the action. For instance, the action 802 includes a list 815 that may be scrolled through to select an application to perform the "get". Similarly, the action 802 includes a box 818 into which the user may directly type information. Other, well known GUI techniques, such as pop-up windows, may be employed.

As each of the actions 802-805 is selected and the associated information is entered, the application 125a generates the script 127a, both shown in FIG. 4. In the illustrated embodiment, the script 127a is written in extensible markup language ("XML"), but any suitable programming language may be used. Each action will be coded into the script 127a with an instruction to perform the selected action and the information used to implement the instruction. However, the application 125a generates this code in the background, and it is not presented to the user. The workflow is instead presented to the user visually, through concrete interface blocks. The user is not required to program the tool itself, but only to arrange the building blocks (i.e., the actions 802-805) and set the options and/or parameters unique to each block. The application 127a then uses these content-agnostic actions 802-805 and the connections between them as the programming tool. Unlike the prior art, there is only one conceptual unit—the action. Everything else, including the types of information passed between the actions 802-805 is hidden from the user. Furthermore, in the illustrated embodiment, each of the actions 602-605 is modular and self contained.

Referring now to FIG. 4 and FIG. 8, at runtime, the user invokes the script 127a, which performs the scripted actions 802-805. Assume for purposes of illustration that the files 405 comprise the files to be "gotten." Upon invocation, the script 127a will invoke the "Finder" application to "get" the files 405, filter out the files $405_0$-$405_x$ that are named438B, copy them, and discard them. Thus, instead of separately performing four OS-level commands and entering the relevant information, the user need only invoke the script 127a. Furthermore, the user need not be conversant with conventional programming techniques, such as use of syntax, etc., to program the script 127a since the application 125a handles all that in the background.

As was described above, the present invention, defines the execution flow at runtime. Should a user select an action prior to selecting an action that would provide the input, a runtime error will occur. The application 125a can detect this problem during the user's selection of the actions. In this scenario, the application 125a presents a warning to the user notifying them of the error and provides the user with an opportunity to correct the error. The user can "click and drag" the offending action to rearrange the order of the selected actions, for instance. Alternatively, in some embodiments, the user can be presented with the information concerning the runtime error at runtime when the error occurs, and the user can go back in and correct the workflow.

To help avoid errors in the selection of actions and to otherwise facilitate creation of the workflow, the illustrated embodiment filters the candidate actions that might next be selected. Returning to FIG. 7, in the pane 704, the application 125a presents to the user a list of candidate actions. The list of candidate actions can be quite large, particularly on a powerful and/or robust platform. Furthermore, some candidate actions might, if selected first, produce a runtime error. For instance, since the illustrated embodiment defines the workflow directly as the order in which the actions are selected, to select an action that requires input as the first action in the workflow will produce an error. Thus, with an empty pane 706, the application 125a might filter the list of candidate actions to present only those candidate actions that require no input and produce output for other actions.

One consideration in this filtering is data type compatibility. For instance, consider a scenario in which a user first selects an action (not shown) that retrieves address book entries. An action to rotate an image would at this point would be inappropriate, since the action needs an image input rather than an address book input. There are several ways to address this problem. For instance, the list of candidate actions can include actions that convert data types that the user can select to manipulate the formatting of the inputs/outputs. Or, the application 125a can filter out actions that require an image input, since no images have yet been retrieved in the currently defined workflow.

To ease data type compatibility concerns, the illustrated embodiment includes a technique for automatic data conversion that is transparent to the user. This automatic data conversion provides data output by one specific action in a specific format that data can then be provided to another action as input in a different format completely without the user's knowledge. The conversion is also performed with no significant data loss, i.e., no loss so great the following actions or actions cannot be implemented. The automatic conversion is performed by instantiating other actions, in the background, that perform the conversion and then are destroyed. Any number of these actions can be created and destroyed in this manner to perform the desired conversion.

Figure 9:
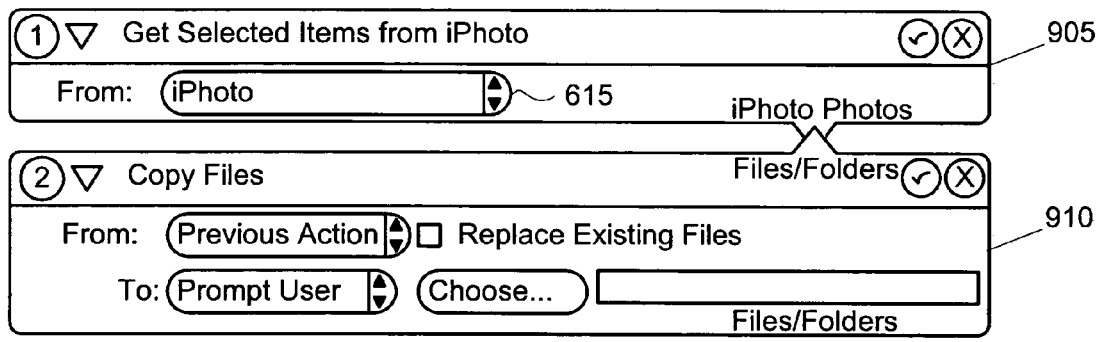
FIG. 9 depicts several selected actions for use in illustrating an automatic, seamless data type conversion feature of some alternative embodiments of the present invention.

Consider the workflow 900, shown in FIG. 9, in which two actions 905, 910 have been selected. In the workflow 900, the action 905 retrieves images from the iPhoto application and the action 910 copies them to a location specified by the user. More particularly, the user will be prompted to enter a location to which to copy the images. The action 905 outputs data in the image format of iPhoto photographs and the action 910 is expecting data input in the format of Finder files. The application 125a in the illustrated embodiment senses this mismatch and scripts the automatic data conversion as the workflow 900 is created. If the application 125a cannot find a way to complete the conversion, the caller of the data conversion is notified. The notification may take place during creation of the workflow 900 and relayed to the user, or may take place at runtime, depending on the implementation.

More particularly, on detecting the mismatch, the application 125a will search for a conversion action (or actions, if needed) that can convert iPhoto photographs to Finder files in one or several steps. The application 125a then automatically scripts those actions in the background, i.e., without the user's knowledge, into the script 127a. The path of data conversion is determined from a conventional, breadth-first search technique implemented by a data conversion engine 410 embedded in the script 127a. Suppose the OS 102, shown in FIG. 4, includes at least four data types. For present purposes, those data types will be identified as A-D, with A being the output of the action 905 (i.e., iPhoto format) and D being the input to the action 910 (i.e., Finder file format). The data conversion engine 410 will first search for a conversion functionality that converts from A to D. The data conversion engine 410 then searches for conversion functionalities that convert to anything from A and anything to D, and moves through this process for B and C. The data conversion engine 410, through this breadth-first search technique produces a list of the identified conversion functionalities from which the application 125a then selects the actions that are then scripted into the script 127a.

In the illustrated embodiment, the data conversion engine 410 uses a variant Universal Type Interface ("UTI"), or type interface, to specify the input and output type from individual actions, or conversion functionalities. Examples include, for instance, com.apple.iphoto.photo and public.alias. More particularly, the data conversion engine 410 employs a reverse-Domain Name Service ("DNS") naming style for specification of data type inputs and outputs. This type interface builds on the reverse-DNS naming convention is established first by Sun's Java class hierarchy and carried over to Mac OS4 with the introduction of Core Foundation's bundle identifiers. The type identification formalizes this naming convention for broader use in Mac OS4.

The syntax of a uniform type identifier matches the Internet's Domain Name syntax as specified in IETF RFC-1035, with three exceptions: (1) every identifier is required to be fully specified (i.e., have at least one domain label preceding the leaf label), (2) the label order is the reverse of that used for DNS names, and (3) in addition to the strict DNS character set (A-Z, a-z, 0-9, "-" and "."), Unicode graphic characters greater than U+007F (non ASCII) are allowed. As with DNS names, both upper- and lower-case letters are permitted in uniform type identifiers, but identifier comparisons are not case-sensitive.

Figure 10:
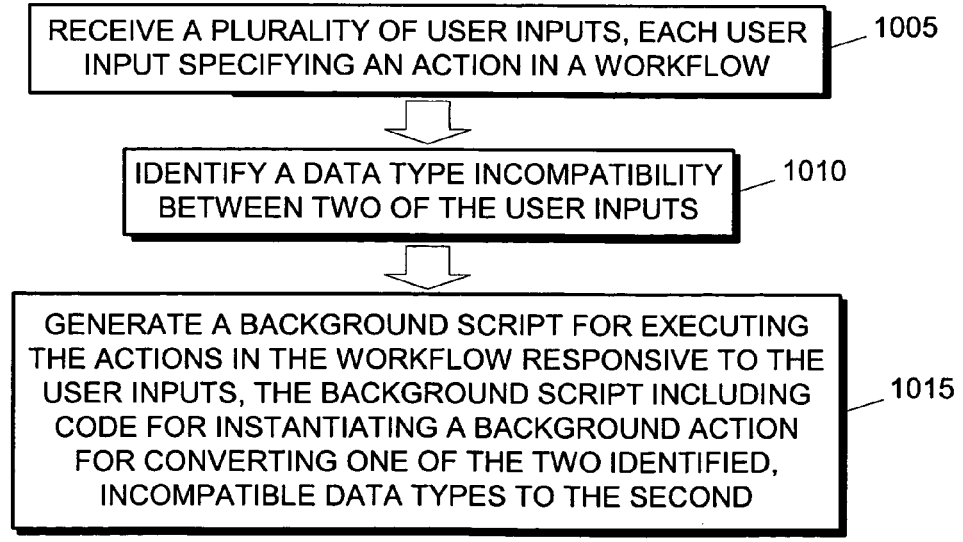
FIG. 10 illustrates one particular embodiment of a method for automatic, seamless data type conversion.

Thus, the illustrated embodiment employs a method 1000, illustrated in FIG. 10, automatically, and seamlessly, converts disparate data types in a workflow, including:
  receiving (at 1005) a plurality of user inputs, each user input specifying an action in a workflow;
  identifying (at 1010) a data type incompatibility between two of the user inputs; and
  generating (at 1015) a background script for executing the actions in the workflow responsive to the user inputs, the background script including code for instantiating a background action for converting one of the two identified, incompatible data types to the second.

Using these types of techniques, the data conversion engine 410 identifies the data types output by the various actions, including the action 905, 910 selected in the workflow 900. The data conversion engine 410 can then determine whether there are converters available, chain them together appropriately, and the call them in order to do each transformation. The length of this transformation chain is unbounded by the data conversion engine 410 in the illustrated embodiment.

Note, however, that not all embodiments need to automatically and seamlessly convert data. In alternative embodiments, subsequent lists of candidate actions from which to choose may be restricted for data type compatibility. Or, the user may be permitted to select actions that will expressly perform the data type conversions. The automatic, seamless conversion of data types, however, provides flexibility and eases the user's burden—in some respects—in creating the workflow.

The automatic, seamless data type conversion does, however, generally tend to increase the number of candidate actions that can be presented to the user in the pane 704 of the window 700, first shown in FIG. 7. Thus, the filtering process of the illustrated embodiment and first mentioned above employs data type conversion as a measure for determining the relevance of a given action as a candidate for selection in the workflow. Since the relevance is defined relative to what has gone before in the creation of the workflow, it depends in some degree on the context. For instance, referring to FIG. 9, the actions 905, 910 each output data in a different type. Thus, the relevance will depend in part on whether any actions have been selected and, if so, whether the last selected action was the action 905 or the action 910.

If there are no selected actions, then the relevance of all candidate actions may be, for instance, set to the same level. Or, candidate actions that accept any data input may be accorded the highest relevance and all others accorded the lowest relevance. In the illustrated embodiment, the user may click on a previously selected action to identify it as the one by which to determine the relevance of the candidate actions. If the user fails to identify a particular action, then the application 125a may identify the last previously selected candidate action.

More particularly, if there are no previously selected actions for the workflow, then candidate actions are accorded relevance by the range of data types that they will accept as input. For instance, actions that will receive anything as input are accorded the highest relevance, followed by actions that will receive a threshold number of data types, followed by actions that meet a second (lesser) threshold, followed by actions that do not receive input. If some actions have already been selected, then relevance is accorded by the degree to which data type conversion will be required. Candidate actions requiring no conversion, i.e., those that can accept the output of the identified action directly as input, are accorded the highest relevance. Candidate actions that will need a threshold number of data type conversions receive the next highest relevance followed by candidate actions that meet a second (higher) threshold number of data type conversions. Candidate actions whose input data type is one to which the output data type of the last-selected action cannot be converted are accorded the lowest relevance.

Figure 11:
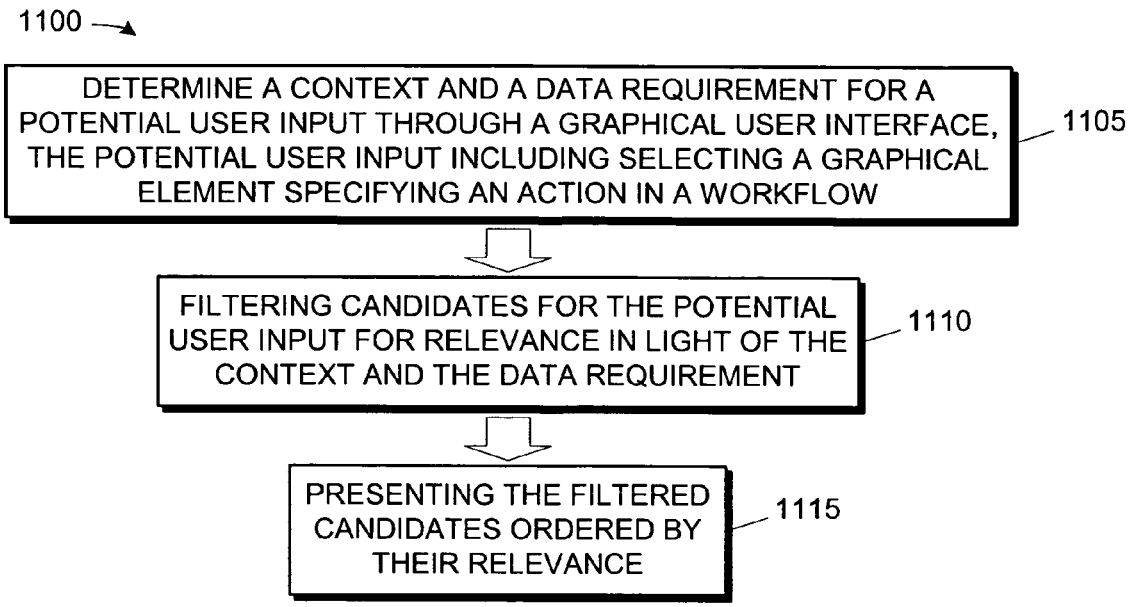
FIG. 11 illustrates one particular embodiment of a method for filtering candidate actions for presentation to a user in accordance with some alternative embodiments of the present invention.

Once the relevance is determined, the list of filtered candidate actions is ordered and presented to the user via the pane 704 of the window 700, first shown in FIG. 7. Thus, the illustrated embodiment includes a method 1100, shown in FIG. 11, comprising:

determining (at 1105) a context and a data requirement for a potential user input through a graphical user interface, the potential user input including selecting a graphical element specifying an action in a workflow;

filtering (at 1110) candidates for the potential user input for relevance in light of the context and the data requirement; and presenting (at 1115) the filtered candidates ordered by their relevance.

Note that, in the illustrated embodiment, the user is not limited to selecting from the list of candidate actions in the pane 704. The user can override the list by selecting a category $Cat_1$-$Cat_7$ in the pane 703, which will present all candidate actions comprising that particular category.

Thus, in the illustrated embodiment, the user opens the workflow scripting window 700, shown in FIG. 7, by invoking the application 125a, shown in FIG. 4, from the pull-down menu 609, shown in FIG. 6. When the window 700 opens, the application 125a filters the candidate actions with which the workflow may be started using the method 1100, shown in FIG. 11. The user then begins creating a workflow, e.g., the workflow 800, shown in FIG. 8. As the workflow is created, the application 125a looks for data-type mismatches and seamlessly and automatically scripts conversions to cure them in accordance with the method 1000, shown in FIG. 10. The application 125 also, after each action in the workflow is selected, again filters the list of candidate actions. When the user is finally finished creating the workflow, they save the script 127a, also shown in FIG. 4, through the application 125a.

The user can then subsequently invoke the script 127a through the GUI 118a of the operating system 102 to execute the defined workflow. As the script 127a is executed, the script 127a employs the scripted data-type conversions using the data conversion engine 410 and automatically determines a path through the defined workflow in accordance with the method 300, shown in FIG. 3. The script 127a can also be invoked repeatedly to save the user the time and difficulties of performing each action in the workflow manually each time the user wishes to perform the task.

The present invention therefore provides a workflow/scripting environment in which each self-contained action is backed by a script of information, but is visually presented to the user as a concrete interface block. As noted above, the user is not required to program the tool itself, only to arrange the actions and set the options and/or parameter unique to each action. The actions are then evaluated by criteria inherent in the built-in engine and executed accordingly.

Ultimately, the user does not "program" the computing apparatus in the conventional sense, or even in the sense of what are known as conventional "visual programming" techniques. The user instead performs the actions necessary to execute the desired task one time, and the application generates an automatic script to actually program the computing apparatus. Thus, the programming knowledge required in prior art "visual programming" techniques is not a requisite for use of the present invention. In the illustrated embodiment, the user need not even worry about data-type mismatches or errors in the order of the workflow. The user performs typical GUI functions in the workflow scripting environment, which then automatically, and in the background, performs the associated programming tasks.

Figure 12:
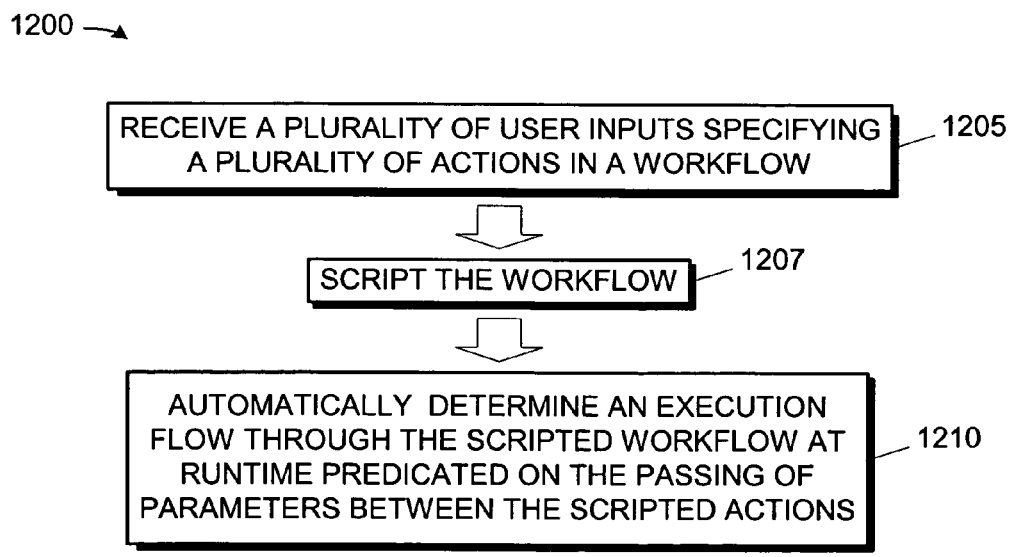
FIG. 12 illustrates one particular embodiment of the method in FIG. 3A in the embodiment of FIG. 4-FIG. 11.

Thus, some alternative embodiments include a method 1200, shown in FIG. 12, which generally comprises:

receiving (at 1205) a plurality of user inputs specifying a plurality of actions in a workflow;

scripting (at 1207) the workflow; and automatically determining (at 1210) an execution flow through the scripted workflow at runtime predicated on the passing of parameters between the scripted actions.

Note that these embodiments contemplate some variation in the implementation of the method 1200.

The illustrated embodiment also has several other notable features. For instance, the invention implements an extensible user interface, and does so with a parametric script. The user interface is extensible because actions may be imported into the environment from other parties (internal or external) and used to create the parametric scripts generated by the application. When invoked, the user may then interface with the extensible actions from another party, and thus the application implements an extensible user interface. The script is parametric in that the user specifies the parameters for the script during the creation of the workflow. Furthermore, because the specified actions are represented graphically, the workflow is reconfigurable by "clicking and dragging" specified actions into an order different than what was originally specified. Note how the module nature of the action facilitates the reconfiguration of the workflow.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for use in a computer programming environment, comprising:

invoking a script; and determining an execution order for the invoked script predicated on the passing of parameters between scripted actions, comprising:

selecting a first scripted action from a plurality of actions, wherein the plurality of actions are contemporaneously selectable with respect to the first scripted action;

executing the first selected scripted action if sufficient parameter information is available to execute the selected first scripted action;

selecting a second scripted action from the plurality of actions in response to determining that there is insufficient parameter information to execute the first selected scripted action;

executing the second selected action and;

wherein the second scripted action converts data from an incompatible data type into a compatible data type and wherein the scripted action are selected from candidate actions chosen according to a determination of relevance relative to previously chosen action and need for conversion of data to compatible data types.

2. The computer-implemented method of claim 1, further comprising executing a third selected action from the plurality of actions.

3. The computer-implemented method of claim 1, wherein selecting the first scripted action includes one of selecting the initial scripted action in the workflow, selecting a scripted action in the workflow at random, or selecting a scripted action according to predetermined criteria.

4. The computer-implemented method of claim 1, further comprising determining a second execution order through the script in parallel with the first execution order.

5. The computer-implemented method of claim 1, wherein invoking the script includes invoking the script through a graphical user interface.

6. The computer-implemented method of claim 1, further comprising at least one of generating the script, storing the script, and executing the script.

7. The computer-implemented method of claim 6, wherein generating the script includes visual programming.

8. The computer-implemented method of claim 6, wherein generating the script includes:
   receiving a plurality of user inputs, each user input specifying an action in a workflow; and
   automatically generating in the background a script for executing the actions in the workflow responsive to the user inputs.

9. The computer-implemented method of claim 6, wherein generating the script includes scripting data conversion between actions in the workflow.

10. The computer-implemented method of claim 1, further comprising:
    creating a workflow to be scripted; and
    filtering candidate actions for inclusion in the workflow.

11. The computer implemented method of claim 1, further comprising automatically converting data types between scripted actions.

12. A program storage medium encoded with instructions that, when executed by a computing device, performs a method for use in a computer programming environment, comprising:
    invoking a script; and
    determining an execution order for the invoked script predicated on the passing of parameters between scripted actions, comprising:
      selecting a first scripted action from a plurality of actions, wherein at least a second scripted action from the plurality of actions are contemporaneously selectable with respect to the first scripted action;
      executing the first selected scripted action if sufficient parameter information is available to execute the selected first scripted action;
      selecting the second scripted action from the plurality of actions in response to determining that there is insufficient parameter information to execute the first selected scripted action;
      executing the second selected action and;
      wherein the second scripted action converts data from an incompatible data type into a compatible data type and wherein the scripted action are selected from candidate actions chosen according to a determination of relevance relative to previously chosen action and need for conversion of data to compatible data types.

13. The program storage medium of claim 12, wherein the encoded method further comprises determining a second execution order through the script in parallel with the first execution order.

14. The program storage medium of claim 12, wherein the encoded method further comprises at least one of generating the script, storing the script, and executing the script.

15. A computing apparatus, comprising:
    a computing device;
    a bus system;
    a storage communicating with the computing device over the bus system; and
    an application residing in the storage that, when invoked, is capable of:
      invoking a script; and
      determining an execution order for the invoked script predicated on the passing of parameters between scripted actions, comprising:
        selecting a first scripted action from a plurality of actions, wherein the plurality of actions are contemporaneously selectable with respect to the first scripted action;
        executing the first selected scripted action if sufficient parameter information is available to execute the selected first scripted action;
        selecting a second scripted action from the plurality of actions in response to determining that there is insufficient parameter information to execute the first selected scripted action;
        executing the second selected action and;
        wherein the second scripted action converts data from an incompatible data type into a compatible data type and wherein the scripted action are selected from candidate actions chosen according to a determination of relevance relative to previously chosen action and need for conversion of data to compatible data types.

16. The computing apparatus of claim 15, wherein, in determining the executed order, the application is further capable of determining a second execution order through the script in parallel with the first execution order.

17. The computing apparatus of claim 15, wherein, in determining the executed order, the application is further capable of at least one of generating the script, storing the script, and executing the scrip.

18. A computer-implemented method for automatically determining an execution order of a scripted workflow, comprising:
    selecting a first scripted action from a plurality of actions, wherein the plurality of actions are contemporaneously selectable with respect to the first scripted action;
    executing the first selected scripted action if sufficient parameter information is available to execute the selected first scripted action;
    selecting a second scripted action from the plurality of actions in response to determining that there is insufficient parameter information to execute the first selected scripted action;
    executing the second selected action and;
    wherein the second scripted action converts data from an incompatible data type into a compatible data type and wherein the scripted action are selected from candidate actions chosen according to a determination of relevance relative to previously chosen action and need for conversion of data to compatible data types.

19. The computer-implemented method of claim 18 further comprising executing a third selected action from the plurality of actions.

20. The computer-implemented method of claim 18, wherein selecting the first scripted action includes one of selecting the initial scripted action in the workflow, selecting a scripted action in the workflow at random, or selecting a scripted action according to predetermined criteria.

21. A program storage medium encoded with instructions that, when executed by a computing device, perform a method for automatically determining an execution order of a scripted workflow, the method comprising:

- selecting a first scripted action from a plurality of actions, wherein the plurality of actions are contemporaneously selectable with respect to the first scripted action;
- executing the first selected scripted action if sufficient parameter information is available to execute the selected first scripted action;
- selecting a second scripted action from the plurality of actions in response to determining that there is insufficient parameter information to execute the first selected scripted action;
- executing the second selected action and;
- wherein the second scripted action converts data from an incompatible data type into a compatible data type and wherein the scripted action are selected from candidate actions chosen according to a determination of relevance relative to previously chosen action and need for conversion of data to compatible data types.

22. The program storage medium of claim 21, further comprising executing a third selected action from the plurality of actions.

23. The program storage medium of claim 21, wherein selecting the first scripted action includes one of selecting the initial scripted action in the workflow, selecting a scripted action in the workflow at random, or selecting a scripted action according to predetermined criteria.

24. A computing apparatus, comprising:
- a computing device;
- a bus system;
- a storage communicating with the computing device over the bus system; and
- an application residing in the storage that, when invoked, is capable of:
  - selecting a first scripted action from a plurality of actions, wherein at least a second scripted action from the plurality of actions are contemporaneously selectable with respect to the first scripted action;
  - executing the first selected scripted action if sufficient parameter information is available to execute the selected first scripted action;
  - selecting the second scripted action from the plurality of actions in response to determining that there is insufficient parameter information to execute the first selected scripted action;
  - executing the second selected action and;
  - wherein the second scripted action converts data from an incompatible data type into a compatible data type and wherein the scripted action are selected from candidate actions chosen according to a determination of relevance relative to previously chosen action and need for conversion of data to compatible data types.

25. The computing apparatus of claim 24, wherein the application is further capable of executing a third selected action from the plurality of actions.

26. The computing apparatus of claim 24, wherein selecting the first scripted action includes one of selecting the initial scripted action in the workflow, selecting a scripted action in the workflow at random, or selecting a scripted action according to predetermined criteria.

* * * * *